Oct. 31, 1944.    C. H. WILSON    2,361,441
HARDNESS TESTING INDENTER
Filed June 24, 1943
Fig. 1.
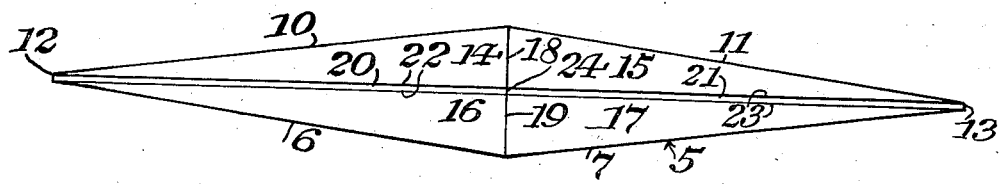
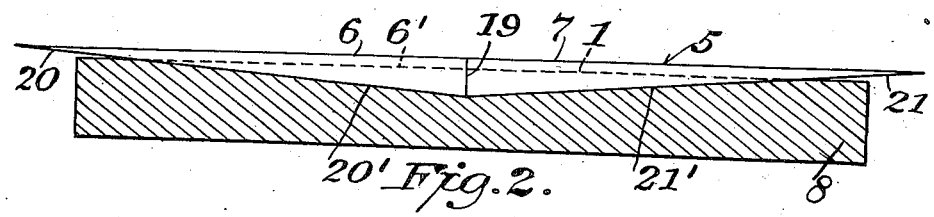
Fig. 2.
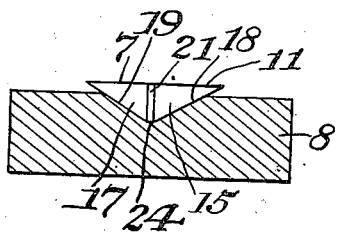
Fig. 3.
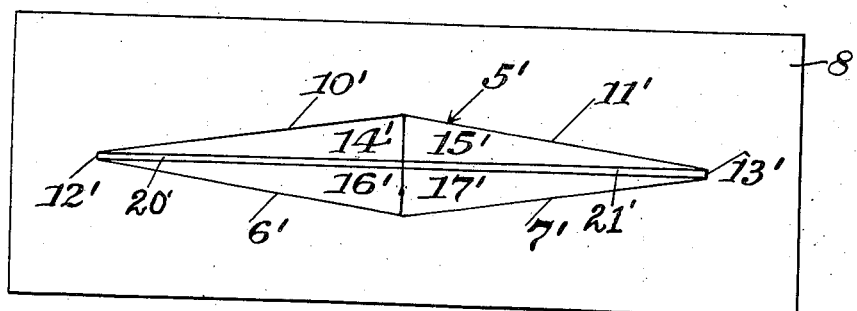
Fig. 4.
INVENTOR.
CHARLES H. WILSON
BY
H. M. Kilpatrick
ATTORNEY Patented Oct. 31, 1944

2,361,441

UNITED STATES PATENT OFFICE 2,361,441

HARDNESS TESTING INDENTER

Charles H. Wilson, Pelham, N. Y., assignor to Wilson Mechanical Instrument Co., Inc., New York, N. Y., a corporation of New York Application June 24, 1943, Serial No. 492,095

2 Claims. (Cl. 73—85)

This invention relates to hardness testing and particularly to indenters or indentation tools of substantially pyramidal shape for testing the relative hardness, elasticity and plasticity of metals and other materials.

One way of measuring hardness is to indent the material with an indentation tool of regular quadrilateral pyramidal shape and measure the diagonal of the indentation as an index to hardness. This type of tool having an included angle of 136 degrees between opposite faces and usually made of diamond or other very hard material, is sometimes used in metallurgical laboratories.

When testing the hardness of very thin material or shallow superficial layers and with extremely light loads, such as 25 or 100 grams, especially when the material is very hard, the size of the impression is extremely minute, and even under a very high power microscope it is difficult to obtain satisfactory readings.

If the pyramidal indenter is made diamond-shaped with one diagonal much longer than the other and the hardness measurement based on the longer diagonal of the indentation, the accuracy of the readings is improved. But even with this diamond-shaped penetrator the readings are difficult and unsatisfactory and improvement thereof has been long sought. Even under a high powered microscope the corners at the ends of the long diagonal are very hard to locate; and on account of the indefiniteness of the two ends of the long diagonal different skilled operators may differ in their measurement thereof more than 10%, which is very unsatisfactory. This is particularly true in testing chrome plate and many hard materials, which are also very thin, with which a light testing load is the only practicable load to use.

The object of the present invention is to generally improve indenters of this type and to remove the cause of the above stated difficulties and to provide an indenter for this class of work that will provide indentations that are easy to read with much more uniform accuracy than heretofore.

The above stated dissatisfaction has been present a long time, and various attempts to overcome it have been unsuccessful until my present invention.

Heretofore it has long been thought that the longer active edges of the diamond shaped indenter should be very sharp to insure the most accurate readings; but I have found, by creating short border lines, instead of the previously preferred sharp points at the ends of the long diagonal of the indentation that the accuracy and uniformity of the readings are greatly improved. These short border lines at right angles to the long axis of the indentation are optically much easier to locate than are sharp points or corners resulting from the previous penetrator.

To this end I provide an indenter which makes an indentation that has at its ends short transverse border lines easy to locate. As an example of an indenter for accomplishing this, I illustrate herein an indenter having a working portion substantially symmetrical to a plane passing radially through the indenter axis, a section of said portion perpendicular to said axis being longest at said plane. The faces of the indenter on opposite sides of said plane are separated from each other and joined together substantially at said plane by a narrow tool face of constant width extending at said plane from the apex through the ends of the working portion.

In the drawing is shown on a much enlarged scale, the working portion of one of many possible indenters embodying my invention.

In the drawing,

Fig. 1 shows a bottom plan of the working portion of the indenter;

Fig. 2 shows a side elevation of such working portion, the indenter penetrating a test specimen shown in section;

Fig. 3 shows an end elevation of the indenter, the specimen being shown in section;

Fig. 4 is a plan of a specimen showing the form of indentation made by the indenter.

As shown in the drawing my indenter 5 has a working portion of approximately the shape of a symmetrical pyramid of such shape that any section perpendicular to its axis has the approximate shape of a much elongated rhomb having cut off ends.

A plane perpendicular to said axis through the lines 6, 7 or the lines 6', 7' of Fig. 2 may represent such section of the working portion, or such plane through the lines 6, 7 may represent the base of the pyramid shaped diamond or other point, and such plane through the lines 6', 7' represent the base of the pyramidal space within the indentation of the work piece 8.

The rhomb of the plane through lines 6, 7, is bounded by long sides 6, 7, 10, 11 and short ends 12, 13; while the rhomb of the plane through lines 6', 7' is bounded by sides 6', 7', 10', 11' and short ends 12', 13', which also represent the edges of the indentation made by the indenter in the test piece 8.

As shown in Fig. 1 the lower working portion of indenter is provided with pairs of faces 14, 15, and 16, 17, the pairs being on opposite sides of a plane of symmetry passing through said axis and the mid-point of said short ends 12, 13, the portions of the faces below any of said sections being equal to each other.

In the example shown, the faces 14, 15 meet at the sharp edge 18 while the faces 16, 17 meet at the sharp edge 19, the edges 18, 19 and the axis lying in a single plane.

On the other hand, the faces 14, 15 do not meet the faces 16, 17 but are separated from each other and are joined together by a truncated band formed by narrow flat or slightly convexed faces 20, 21, which may be about 2 to 6 microns wide, or other convenient width, and perpendicular to said plane of symmetry, and extend to or through the short ends 12, 13. As thus described the narrow faces have more or less distinct parallel side edges 22, 23, and meet in a short transverse optical edge 24 of the same length as the end edges 12, 13.

With an indenter as above described, the indentation 5' in the work piece 8, is also symmetrical to the main plane of symmetry and has corresponding side edges 6', 7', 10', 11', enclosing a rhomb, and has side faces 14', 15', 16', 17' and narrow faces 20', 21'; and the indentation, no matter of what depth, always provides the short end edges 12', 13' which are optically easy to locate.

In addition to the above advantages, the flat or blunted faces 20, 21 do not tend to break away in grinding as is true of the sharp edged indenters heretofore; and the edges 18, 19 may also be blunted or eliminated to prevent breakage there also.

The ratio of the distance between the end edges 12, 13 or 12', 13' to the width of the rhomb should be considerable, and a ratio of 7.11 to 1 has been found desirable and satisfactory. An angle of about 172½ degrees between faces 20 and 21 and an angle of about 130 degrees between edges 18, 19 have been found satisfactory; but other angles and ratios may under certain conditions be found desirable.

While sharp edges 18, 19 are shown on opposite sides of the plane of symmetry, more than two sharp edges may be provided if desired, and it is not strictly necessary that these edges be sharp or distinct. But it is preferable that the pyramid be symmetrical to said plane of symmetry and also to the plane passing through lines 18 and 19. It is important that the faces 22, 23 be long relative to the width of the indenter and that the indentation have distinct end edges 12', 13'.

In applications where the indentation tool is employed to measure hardness of individual crystals or components of metals and the long diagonal of the indentation must be kept to less than some dimension of such crystal or component, the testing load must be a minimum and the truncated band or faces 20, 21 would be about two microns wide so as to be a fraction of length of the short diagonal of the indentation.

Where longer diagonal dimensions and greater depths of indentation are permissible, as in the survey of physical properties of the material to be tested, it may be desirable to have the width of truncated band 4 to 6 microns wide, for then that dimension would still be a fraction of the small diagonal of the indentation.

In general, comparing the indentation of my indenter with the indentation of other similar indenters having long sharp edges in place of the truncated band 20, 21 of my indenter, the shape of the indentation of my indenter should depart from the shape of the indentation of such other indenters by only so much as is needed to give the advantage of my truncated faces 20, 21.

The invention claimed is:

1. An indentation tool having an apex and a working portion of such shape that a section thereof perpendicular to the tool axis is elongate; said tool having a narrow face about 2 to 6 microns wide passing through the apex and the ends of said section and substantially transverse to a plane passing through said apex and ends and provided at its ends with transverse border lines; said face being of substantially constant width thereby facilitating accuracy of readings at different depths.

2. An indentation tool having an apex and a working portion of such shape that a section thereof perpendicular to the tool axis is elongate; said tool having a narrow face of the tool about 2 to 6 microns wide passing through the apex and the ends of said section and substantially perpendicular to a plane passing through said apex and ends; whereby the indentation made by said tool is provided at the ends with short transverse border lines which are optically easy to locate.

CHARLES H. WILSON.